United States Patent
Kaiser et al.

(10) Patent No.: US 7,765,052 B2
(45) Date of Patent: Jul. 27, 2010

(54) VARIABLE ACTIVE FUEL MANAGEMENT DELAY WITH HYBRID START-STOP

(75) Inventors: Jeffrey M. Kaiser, Highland, MI (US); Michael J. Pitsch, Ann Arbor, MI (US); James B. Hicks, Shelby Township, MI (US); William C. Albertson, Clinton Township, MI (US)

(73) Assignee: GM Global Technology Operations, Inc.

( * ) Notice: Subject to any disclaimer, the term of this patent is extended or adjusted under 35 U.S.C. 154(b) by 310 days.

(21) Appl. No.: 12/056,535

(22) Filed: Mar. 27, 2008

(65) Prior Publication Data

US 2009/0150055 A1 Jun. 11, 2009

Related U.S. Application Data

(60) Provisional application No. 60/992,386, filed on Dec. 5, 2007.

(51) Int. Cl.
*G06F 19/00* (2006.01)
*F01L 1/34* (2006.01)
*F02D 13/06* (2006.01)

(52) U.S. Cl. .............. 701/103; 123/90.15; 123/198 F
(58) Field of Classification Search ... 123/90.11–90.18, 123/196 R, 198 F; 701/101–103, 112, 113; 184/1.5, 6.5, 6.11; 141/65, 67, 192; 251/77, 251/89, 94, 119
See application file for complete search history.

(56) References Cited

U.S. PATENT DOCUMENTS

| | | | | |
|---|---|---|---|---|
| 4,452,037 | A * | 6/1984 | Waddington et al. | 184/6.11 |
| 6,213,173 | B1 * | 4/2001 | Bedi et al. | 184/1.5 |
| 6,584,942 | B1 * | 7/2003 | Albertson et al. | 123/90.16 |
| 6,745,735 | B2 * | 6/2004 | Smith | 123/90.17 |
| 7,562,530 | B2 * | 7/2009 | Kolmanovsky | 60/612 |
| 2006/0260323 | A1 * | 11/2006 | Moulebhar | 60/793 |

* cited by examiner

*Primary Examiner*—Willis R Wolfe, Jr.

(57) ABSTRACT

A control system for a hybrid vehicle including an engine with cylinder deactivation comprises an engine time off module that determines an engine time off value. A re-purge determining module estimates a re-purge time required to purge a hydraulic control system of the engine of air before initiating cylinder deactivation. The re-purge time is estimated based on the engine time off value and an engine temperature.

9 Claims, 5 Drawing Sheets

VARIABLE ACTIVE FUEL MANAGEMENT DELAY WITH HYBRID START-STOP

CROSS-REFERENCE TO RELATED APPLICATIONS

This application claims the benefit of U.S. Provisional Application No. 60/992,386, filed on Dec. 5, 2007. The disclosure of the above application is incorporated herein by reference in its entirety.

FIELD

The present disclosure relates to engine control systems, and more particularly to engine control systems for hybrid vehicles with cylinder deactivation.

BACKGROUND

The statements in this section merely provide background information related to the present disclosure and may not constitute prior art.

Both active fuel management (AFM) or cylinder deactivation and hybrid propulsion systems may be used to improve fuel economy in vehicles. Cylinder deactivation involves deactivating one or more cylinders of an engine during low load conditions to reduce pumping losses.

Hybrid propulsion systems typically include a first torque generator, such as an internal combustion engine (ICE), and a second torque generator, such as an electric machine (EM). Each can provide torque to a driveline to propel a vehicle. Various configurations of hybrid powertrains can be used, including a strong hybrid powertrain, a mild hybrid powertrain and/or other hybrid types. In a strong hybrid powertrain, the EM can drive the driveline directly, without transferring torque through a component of the ICE.

In a mild hybrid configuration, the EM is coupled with the ICE, such as through the front end accessory drive. Torque generated by the EM is transferred to the driveline through the ICE. An exemplary mild hybrid powertrain includes a belt alternator starter (BAS) system. In the BAS system, the EM is coupled to the ICE via a traditional belt and pulley configuration, which drives other accessory components including, but not limited to, pumps and compressors.

When coupled together, these technologies are capable of providing further fuel savings. One hybrid propulsion efficiency improvement is the engine start-stop feature. During periods where a conventional engine would be idling, the hybrid system stops the engine to increase fuel savings. When the system senses that the driver is about to request the vehicle to accelerate, the hybrid system restarts the engine and may assist the engine in the subsequent vehicle acceleration.

In a system that combines cylinder deactivation with hybrid propulsion, there are times where it is advantageous to deactivate engine cylinders soon after the restart of a hybrid start-stop sequence. Some systems with cylinder deactivation require a time period to completely purge a hydraulic control system of air before cylinder deactivation can occur. For example, a lifter oil manifold assembly (LOMA) and its associated passages in the cylinder block may need to be purged. Current approaches use a predetermined fixed period to allow the purge to occur.

The predetermined fixed period assumes a worst-case condition where the engine off-time completely drains the engine oil galleries of oil. In a non-hybrid vehicle, this delay is not a fuel economy detriment. However in a hybrid vehicle with cylinder deactivation, this delay in deactivating cylinders may be a significant loss in fuel saving opportunity.

SUMMARY

A control system for a hybrid vehicle including an engine with cylinder deactivation comprises an engine time off module that determines an engine time off value. A re-purge determining module estimates a re-purge time required to purge a hydraulic control system of the engine of air before initiating cylinder deactivation. The re-purge time is estimated based on the engine time off value and an engine temperature.

A method for operating a hybrid vehicle including an engine with cylinder deactivation includes determining an engine time off value; and estimating a re-purge time required to purge a hydraulic control system of the engine of air before initiating cylinder deactivation, wherein the re-purge time is estimated based on the engine time off value and an engine temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
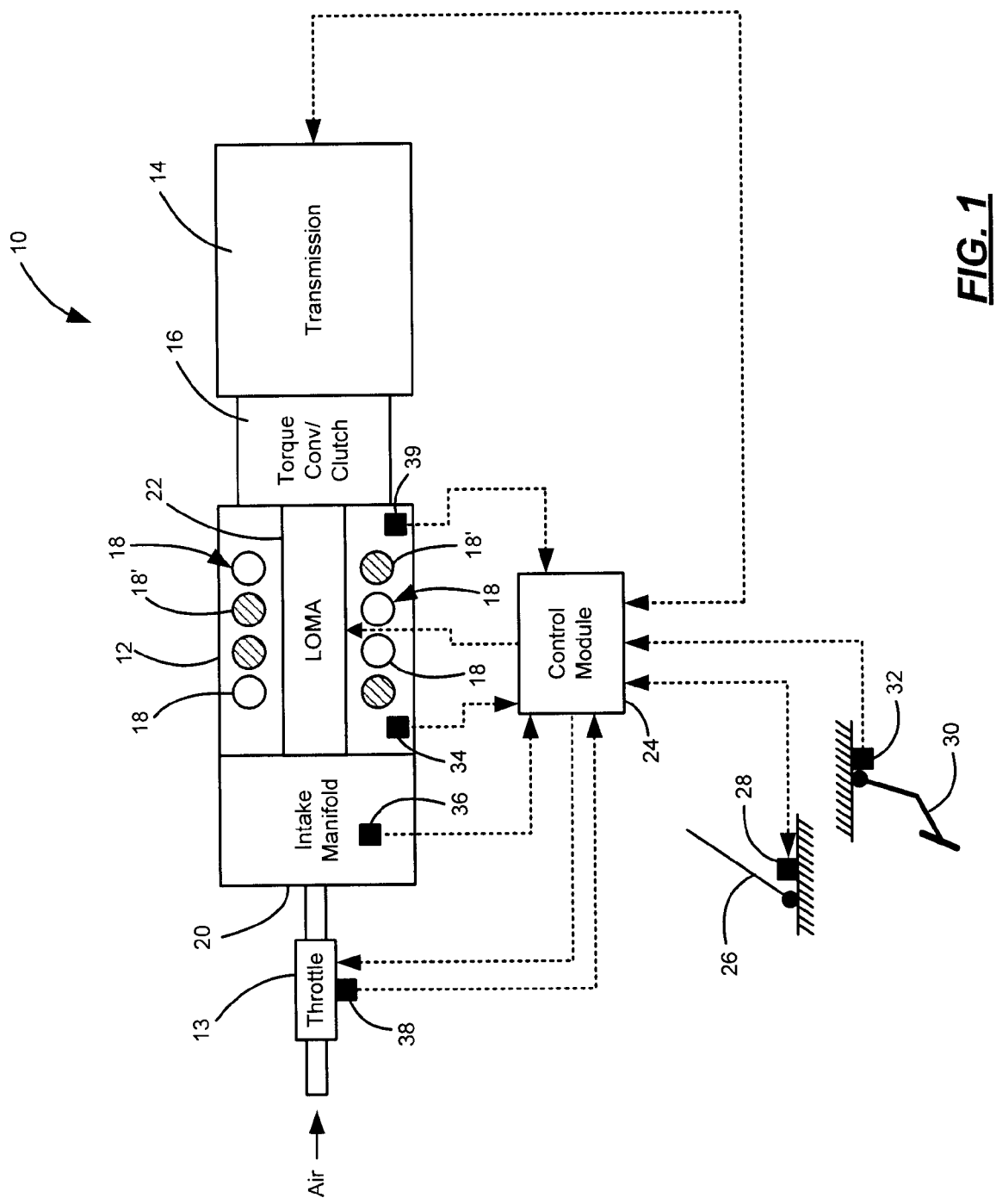
FIG. 1 is a functional block diagram illustrating variable displacement components of an exemplary variable displacement and hybrid engine system.

The following description is merely exemplary in nature and is not intended to limit the present disclosure, application, or uses. For purposes of clarity, the same reference numbers will be used in the drawings to identify the same elements. As used herein, activated refers to operation using all of the engine cylinders. Deactivated refers to operation using less than all of the cylinders of the engine (one or more cylinders not active). As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

According to the present disclosure, drain-back and re-purge time of the LOMA are characterized at various engine temperatures. Partial drain-back may result in shorter re-purge times. This information can then be used in hybrid vehicle with cylinder deactivation to allow cylinder deactivation earlier. For example, the conventional fixed time period may be set equal to 30 seconds after restart. The present disclosure shortens the time period using physical LOMA/oil gallery drain-back and purge characteristics, engine off time, and engine temperature to determine the delay period.

In some implementations, at engine restart, a period that the crankshaft has been stopped and a period that the crankshaft has been rotating are used to index a LOMA re-purge time table to determine an appropriate cylinder deactivation delay. For system protection, this control approach may be enabled when hybrid start-stop is enabled. In other words, this reduced delay may or may not be used during an initial cold start.

Referring now to FIG. 1, a vehicle 10 includes an engine 12 that drives a transmission 14. The transmission 14 can include, but is not limited to, a manual transmission, an automatic transmission, a continuously variable transmission (CVT) and an automated manual transmission (AMT). The transmission 14 is driven by the engine 12 through a corresponding torque converter or clutch 16. The transmission 14 is electronically controlled by a control module 24.

Air flows into the engine 12 through a throttle 13. The engine 12 includes N cylinders 18. One or more select cylinders 18' may be selectively deactivated during engine operation. Although FIG. 1 depicts eight cylinders (N=8), the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18. The engine also includes a lifter oil manifold assembly (LOMA) 22 that deactivates selected ones of the cylinders 18', as described in further detail below.

A control module 24 communicates with the engine 12 and various inputs and sensors as discussed herein. A vehicle operator manipulates an accelerator pedal 26 to regulate the throttle 13. More particularly, a pedal position sensor 28 generates a pedal position signal that is communicated to the control module 24. The control module 24 generates a throttle control signal based on the pedal position signal. A throttle actuator (not shown) adjusts the throttle 13 based on the throttle control signal to regulate air flow into the engine 12.

The vehicle operator manipulates a brake pedal 30 to regulate vehicle braking. More particularly, a brake position sensor 32 generates a brake pedal position signal that is communicated to the control module 24. The control module 24 generates a brake control signal based on the brake pedal position signal. A brake system (not shown) adjusts vehicle braking based on the brake control signal to regulate vehicle speed.

An engine speed sensor 34 generates a signal based on engine speed. An intake manifold absolute pressure (MAP) sensor 36 generates a signal based on a pressure of the intake manifold 20. A throttle position sensor (TPS) 38 generates a signal based on throttle position.

During low engine load, the control module 24 may transition the engine 12 to the deactivated mode. In an exemplary embodiment, N/2 cylinders 18' (i.e. half of the cylinders N) are deactivated, although any number of cylinders may be deactivated. Upon deactivation of the select cylinders 18', the control module 24 increases the power output of the remaining or activated cylinders 18. Inlet and exhaust ports (not shown) of the deactivated cylinders 18' are closed to reduce pumping losses.

The engine load may be determined based on the intake MAP, cylinder mode and engine speed. More particularly, if the MAP is below a threshold for a given engine revolutions per minute (RPM), the engine load may be deemed light and the engine 12 may be transitioned to the deactivated mode. If the MAP is above the threshold for the given RPM, the engine load may be deemed heavy and the engine 12 is operated in the activated mode. The control module 24 controls the LOMA 22 as discussed in further detail below.

Figure 2:
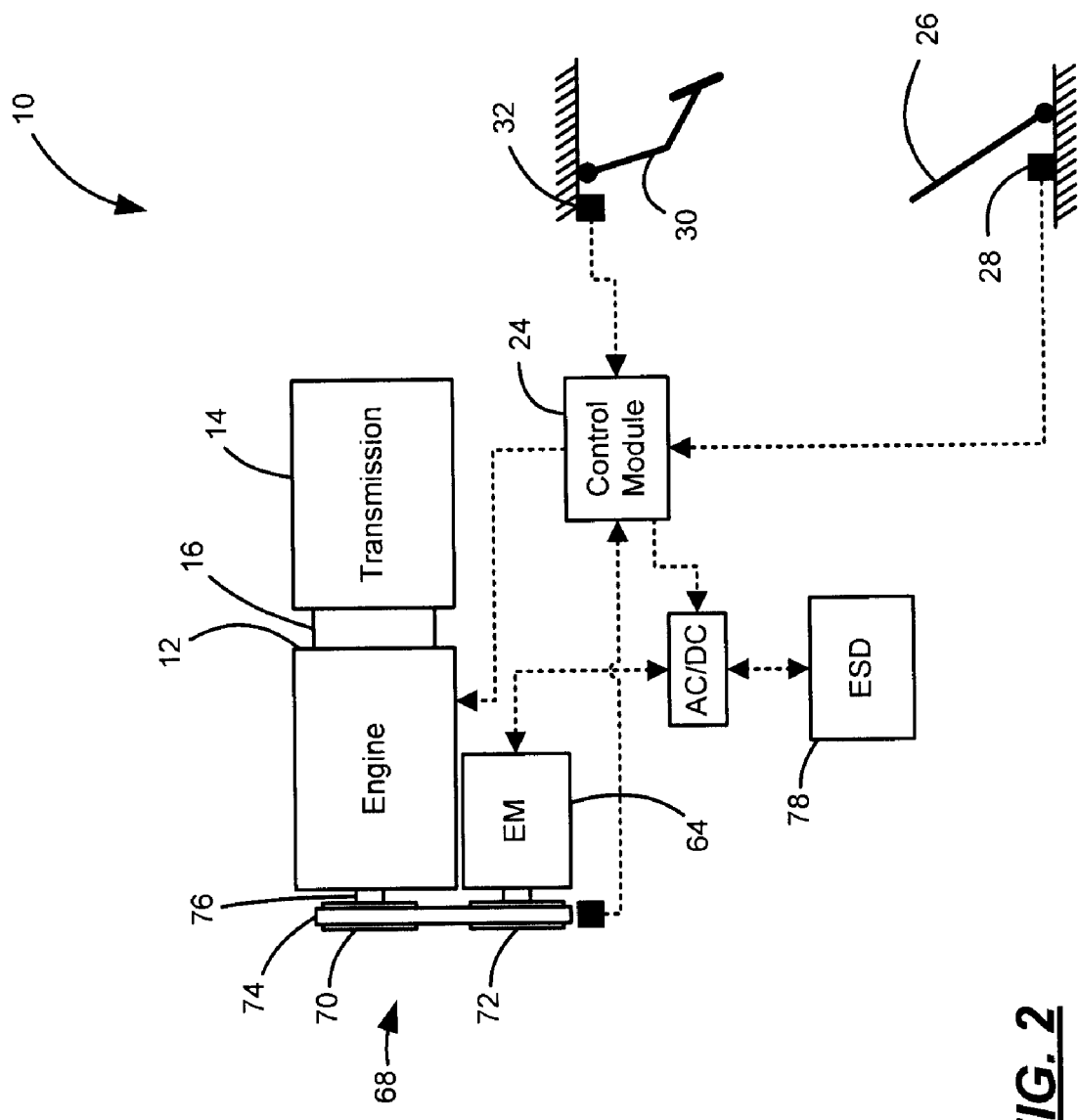
FIG. 2 is a functional block diagram illustrating hybrid components of the engine of FIG. 1.

Referring now to FIG. 2, the engine 12 and electric machine 64 are coupled via a belt-alternator-starter (BAS) system 68. More specifically, the electric machine 14 operates as a starter (i.e., motor) and an alternator (i.e., generator) and is coupled to the engine 12 through a belt and pulley system. The engine 12 and the electric machine 64 include pulleys 70, 72, respectively, that are coupled for rotation by a belt 74. The pulley 70 is coupled for rotation with a crankshaft 76 of the engine 12. While a mild hybrid configuration is shown, a strong hybrid may also be used.

In one mode, the engine 12 drives the electric machine 64 to generate power used to recharge an energy storage device (ESD) 78. In another mode, the electric machine 64 drives the engine 12 using energy from the ESD 78. An AC/DC converter 79 may be used between ESD and the electric machine 64. The ESD 78 can include, but is not limited to, a battery or a super-capacitor. Alternatively, the BAS system 68 can be replaced with a flywheel-alternator-starter (FAS) system (not shown), which includes an electric machine operably disposed between the engine and the transmission or a chain or gear system that is implemented between the electric machine 64 and the crankshaft 76.

During periods where low drive torque is needed to drive the vehicle (i.e., a hybrid engine off mode), drive torque may be provided by the electric machine 64. When in the hybrid engine off mode, fuel and spark are cut-off to the cylinders of the engine. Further, opening and closing cycles of the intake and exhaust valves can be prevented to inhibit air flow processing within the cylinders.

Figure 3:
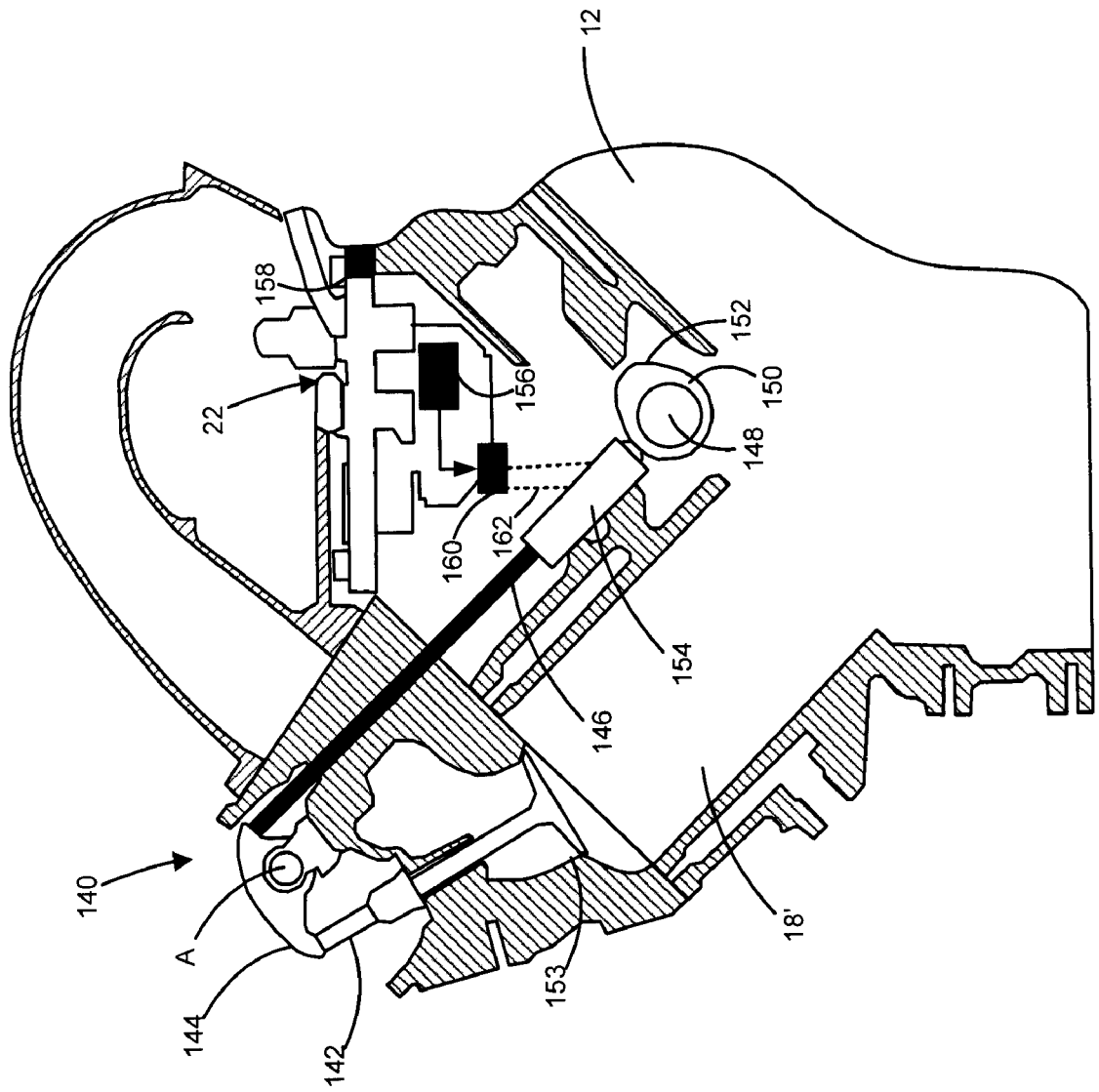
FIG. 3 illustrates the exemplary variable displacement components of FIG. 1 in further detail.

Referring now to FIG. 3, an intake valvetrain 140 of the engine 12 includes an intake valve 142, a rocker 144 and a pushrod 146 associated with each cylinder 18. The engine 12 includes a rotatably driven camshaft 148 having a plurality of valve cams 150 disposed there along. A cam surface 152 of the valve cams 150 engage the lifters 154 to cyclically open and close intake ports 153 within which the intake valves 142 are positioned. The intake valve 142 is biased to a closed position by a biasing member (not shown) such as a spring. As a result, the biasing force is transferred through the rocker 144 to the pushrod 146, and from the pushrod 146 to the lifter 154, causing the lifter 154 to press against the cam surface 152.

As the camshaft 148 rotates, the valve cam 150 induces linear motion of the corresponding lifter 154. The lifter 154 induces linear motion in the corresponding pushrod 146. As the pushrod 146 moves outward, the rocker 144 pivots about an axis (A). Pivoting of the rocker 144 induces movement of the intake valve 142 toward an open position, thereby opening the intake port 153. The biasing force induces the intake valve 142 to the closed position as the camshaft 148 continues to rotate. In this manner, the intake port 153 is cyclically opened to enable air intake.

Although the intake valvetrain 140 of the engine 12 is illustrated in FIG. 3, the engine 12 may also include an exhaust valvetrain (not shown) that operates in a similar manner. More specifically, the exhaust valvetrain includes an exhaust valve, a rocker and a pushrod associated with each cylinder 18. Rotation of the camshaft 148 induces reciprocal motion of the exhaust valves to open and close associated exhaust ports, as similarly described above for the intake valvetrain.

The LOMA 22 provides pressurized fluid to a plurality of lifters 154 and includes solenoids 156 (shown schematically) associated with select cylinders 18' as shown in FIG. 1. The select cylinders 18' are those that are deactivated when operating the engine 12 in the deactivated mode. The lifters 154 are disposed within the intake and exhaust valvetrains to provide an interface between the cams 150 and the pushrods 146. In general, there are two lifters 154 provided for each select cylinder 18' (one lifter for the intake valve 142 and one lifter for the exhaust valve). It is anticipated, however, that more lifters 154 can be associated with each select cylinder 18' (i.e., multiple inlet or exhaust valves per cylinder 18'). The LOMA 22 may include a pressure sensor 158 that generates a pressure signal indicating a pressure of a hydraulic fluid supply to the LOMA 22. One or more pressure sensors 158 may be implemented.

Each lifter 154 associated with the select cylinders 18' is hydraulically actuated between first and second modes. The first and second modes respectively correspond to the activated and deactivated modes. In the first mode, the lifter 154 provides a mechanical connection between the cam 150 and the pushrod 146. In this manner, the cam 150 induces linear motion of the lifter 154, which is transferred to the pushrod 146. In the second mode, the lifter 154 functions as a buffer to provide a mechanical disconnect between the cam 150 and the pushrod 146. Although the cam 150 induces linear motion of the lifter 154, the linear motion is not transferred to the pushrod 146.

The solenoids 156 selectively enable hydraulic fluid flow to the lifters 154 to switch the lifters 154 between the first and second modes. Although there is generally one solenoid 156 associated with each select cylinder 18' (i.e., one solenoid for two lifters), it is anticipated that more or fewer solenoids 156 can be implemented. Each solenoid 156 actuates an associated valve 160 (shown schematically) between open and closed positions. In the closed position, the valve 160 inhibits pressurized hydraulic fluid flow to the corresponding lifters 154. In the open position, the valve 160 enables pressurized fluid flow to the corresponding lifters 154 via a fluid passage 162. The pressurized hydraulic fluid flow is provided to the LOMA 22 from a pressurized hydraulic fluid source.

Figure 4:
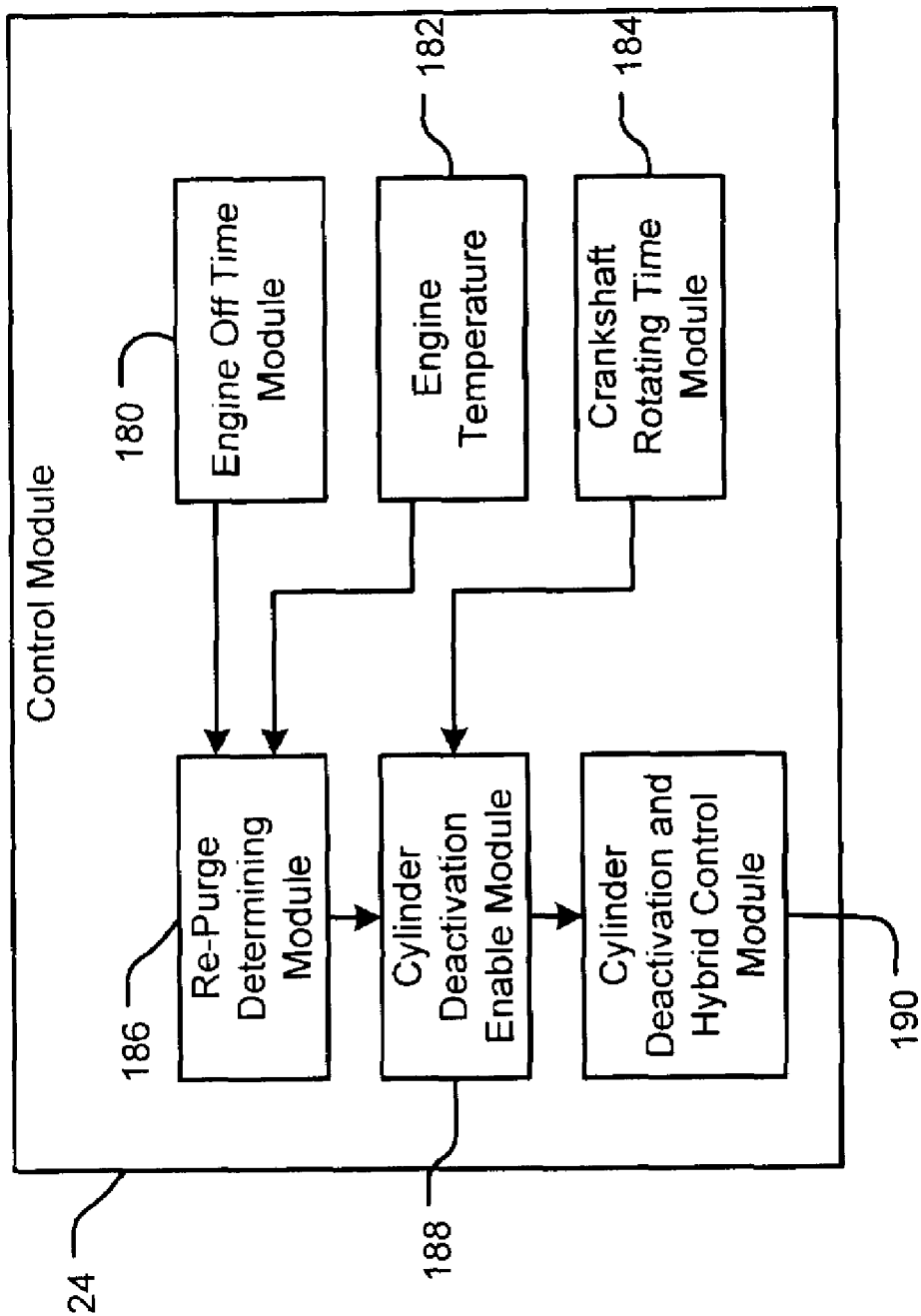
FIG. 4 illustrates an exemplary control module in further detail.

Referring now to FIG. 4, an exemplary implementation of the control module 24 is shown in further detail. The control module 24 includes an engine time off module 180 that determines an engine time off. An engine temperature 182 and the engine time off are input to a re-purge determining module 186. The re-purge determining module 186 estimates a re-purge time based on the engine time off and the engine temperature. The re-purge determining module 186 may employ a mathematical relationship or a lookup table. A cylinder deactivation enable module 188 receives the re-purge time and a crankshaft rotating time from a crankshaft rotating time module 184 and selectively enables a cylinder deactivation control module 190. The cylinder deactivation control module 190 controls cylinder deactivation.

Figure 5:
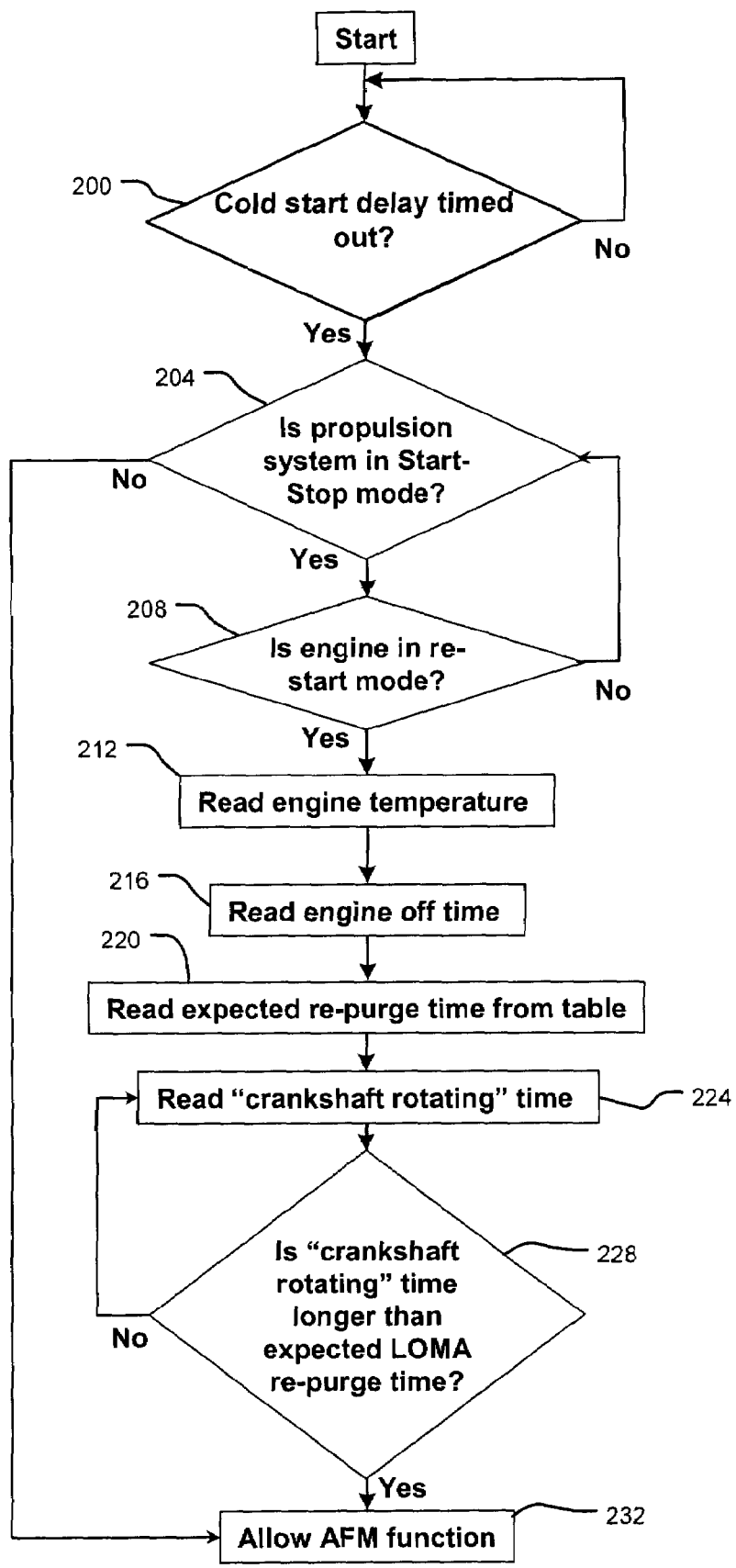
FIG. 5 is a flowchart illustrating an exemplary method for operating the engine system of FIG. 1.

Referring now to FIG. 5, exemplary steps of a method for operating the engine system of FIGS. 1-3 are shown. In step 200, control optionally determines whether a cold start timer delay has timed out. In step 204, control determines whether a propulsion system is in a start-stop mode. If step 204 is true, control continues with step 208 and control determines whether the engine is in a restart mode. If step 208 is false, control returns to step 204. If step 208 is true, control reads the engine temperature in step 212. In step 216, control reads the engine time off. In step 220, control reads an expected re-purge time from a lookup table or calculates the expected purge time using a mathematical relationship that is based on the engine time off and the engine temperature.

In step 228, control determines whether the crankshaft rotating time is longer than the expected LOMA re-purge time. If step 228 is true, control continues with step 232 and allows the cylinder deactivation function. If step 228 is false, control returns to step 224. Control also continues with step 232 from step 204 when step 204 is false.

What is claimed is:

1. A control system for a hybrid vehicle including an engine with cylinder deactivation, comprising:
   an engine time off module that determines an engine time off value; and
   a re-purge determining module that estimates a re-purge time to purge a hydraulic control system of said engine of air before initiating cylinder deactivation, wherein said re-purge time is estimated based on said engine time off value and an engine temperature.

2. The control system of claim 1 wherein said re-purge determining module includes a lookup table.

3. The control system of claim 1 further comprising a crankshaft rotating time module that determines a crankshaft rotating time that is based on a period after said engine is restarted.

4. The control system of claim 3 further comprising a hybrid and cylinder deactivation control module that selectively enables said cylinder deactivation based on said crankshaft rotating time and said re-purge time.

5. The control system of claim 4 wherein said hybrid and cylinder deactivation control module enables said cylinder deactivation after said crankshaft rotating time is greater than said re-purge time.

6. A method for operating a hybrid vehicle including an engine with cylinder deactivation, comprising:
   determining an engine time off value; and
   estimating a re-purge time to purge a hydraulic control system of said engine of air before initiating cylinder deactivation,
   wherein said re-purge time is estimated based on said engine time off value and an engine temperature.

7. The method of claim 6 further comprising determining a crankshaft rotating time that is based on a period after said engine is restarted.

8. The method of claim 7 further comprising selectively enabling said cylinder deactivation based on said crankshaft rotating time and said re-purge time.

9. The method of claim 8 further comprising enabling said cylinder deactivation after said crankshaft rotating time is greater than said re-purge time.

* * * * *